Patented Mar. 29, 1949

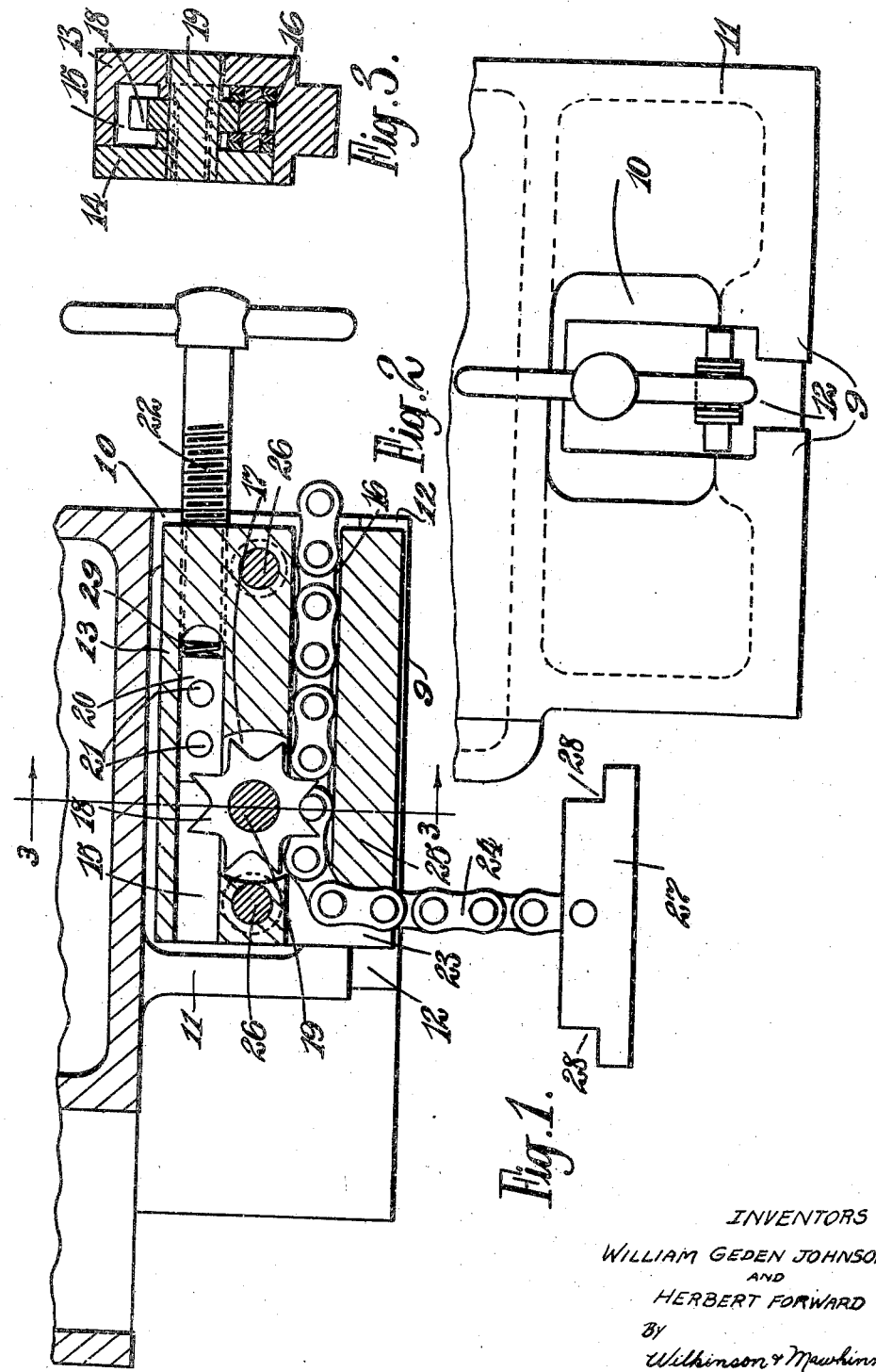

2,465,729

UNITED STATES PATENT OFFICE 2,465,729

CHAIN CLAMP

William Geden Johnson, Angmering, and Herbert Forward, Morden, England

Application June 5, 1946, Serial No. 674,620
In Great Britain June 8, 1945

5 Claims. (Cl. 77—2)

This invention relates to clamps having a chain, and means for imparting tension to the chain, in order to effect a clamping action, and has for an object to provide an arrangement in which clamping members may be disposed at opposite ends of a bore or channel in a part being clamped.

According to this invention, a clamp comprises a body part having a clamping face formed thereon, a sprocket wheel, or wheels, rotatably mounted on said body part, an irreversible drive for said sprocket wheel, or wheels, a chain engaging said sprocket wheel, or wheels, and a clamping member secured to said chain and having a clamping face which may be arranged opposite the first said clamping face. In the case where such a clamp is employed for clamping a part having a bore extending therethrough, the clamping faces are of such a size as to extend across the bore, and the last-mentioned clamping member is so shaped and dimensioned that it may be swivelled on the chain into such a position that it can be passed through the bore and then moved into a position to overlap the faces on either side of the bore.

The aforesaid irreversible drive may comprise a movable abutment guided in said body part so that its path of movement is in line with the teeth on the sprocket wheel, and screw or toggle means for imparting movement to said abutment.

The abutment may comprise a toothed rack, or one or more cylindrical pins rectilinearly guided in said body part, and in the case where pins are employed, the axis of each pin is arranged parallel with the axis of the sprocket wheel.

The aforesaid rectilinearly guided block may be moved by a lead-screw in threaded engagement with the body part or by a toggle linkage. A suitable shock absorber may be interposed between the movable abutment and the lead screw or toggle linkage.

The chain may be guided in a passage having a part thereof arranged parallel with the guide for said block.

The following is a description of clamp suitable for securing a boring machine, such as is described in the specification of British patent application No. 14,066/45, to a cylinder block, reference being made to the accompanying drawing, in which—

Figure 1 is a vertical section through the base of the apparatus;

Figure 2 is an elevation looking to the right of Figure 1, and

Figure 3 is a section on the line 3—3 of Figure 1.

A housing 10 is formed in the base 11 of the boring machine so as to provide an opening in the back wall thereof, and a T-slot 12 on the underside of the base. The body part 9 of the clamp is formed in two main portions 13 and 14, the former of which is machined to provide two channels 15 and 16 parallel to one another, one of which channels 16 extends from one side of the body part to the other, while the other 15 terminates short of one side. The wall between the two channels is cut away to provide a recess 17 in which is mounted a sprocket wheel 18 so that its teeth project into both channels. The sprocket wheel is carried by a pin 19 fixed in said body portion. Mounted in the shorter of the two slots is a rack or block 20 having a number of pins 21 extending parallel with the axis of the sprocket wheel, and spaced apart from one another to correspond with the pitch of the teeth in the sprocket wheel. The material of the body portion at the end of the smaller slot is provided with a threaded hole to receive a lead screw 22. A shock absorber 29 may be arranged between the end of the lead screw and the end of the block. The outer wall 25 of the other slot is cut away at 23 at that end of the body portion remote from the lead-screw. A chain 24 is arranged to extend through said slot and round into the aforesaid cut away portion. The last-mentioned wall is so shaped as to engage the T-slot 12 in the housing in the base of the machine tool. The other body portion comprises a plate 14 which covers the two slots and is provided with a hole for accommodating the end of the pinion shaft 19. The two body portions are secured together by securing bolts 26. Pivoted to the end of the chain which projects from the cut-away portion of said slot is one or a number of cross-bars 27 having stepped ends 28 so as to provide a portion which will register with the bore of a cylinder and an overlying portion which will engage the end faces of the cylinder.

It will be appreciated with this arrangement, that the assembled clamps may be slid into position in the housing in the base member.

In order to clamp the boring machine to a cylinder block which is to be bored the base of the boring machine is brought into abutting relationship with the top of the cylinder block, and the cross bar 27 at the end of the chain 24 is swivelled into such a position that it may be passed into one of the cylinder bores, the lead screw 22 having been adjusted so that the stretch of the chain 24 below the base of the boring machine is sufficient to enable the cross bar 27 to pass to the lower end of the cylinder block when the cross bar can be swivelled into such a position that the stepped ends 28 engage the under face of the block. In Figure 1 for convenience the length of the chain is shown much shorter than would be required in practice. The lead screw is then rotated so as to raise the cross bar whereby the base of the boring machine is drawn into firm contact with the top of the cylinder block. In this position the boring machine may be brought into the appropriate position for boring the cylinder next to the one to which the chain 24 extends.

We claim:

1. A clamp comprising a body part having a clamping face formed thereon, a sprocket wheel rotatably mounted on said body part, guideways in said body part arranged to extend tangentially on either side of said sprocket wheel, a chain arranged in one of said guideways in engagement with said sprocket wheel, an abutment mounted in the other guideway having means adapted to impart movement thereto along said guideway so as to engage the teeth of the sprocket wheel, and a clamping member secured to an end of the chain which projects from said guideway so that the clamping member is disposed opposite said clamping face.

2. A clamp comprising a body part having a clamping face formed thereon, a sprocket wheel rotatably mounted on said body part, guideways in said body part arranged to extend tangentially on either side of said sprocket wheel, a chain arranged in one of said guideways in engagement with said sprocket wheel, an abutment mounted in the other guideway, a screw threaded member engaging a threaded hole in said body part and abutting against said abutment so as to impart movement thereto along said guideway so as to engage the teeth of the sprocket wheel, and a clamping member secured to an end of the chain which projects from said guideway so that the clamping member is disposed opposite said clamping face.

3. A clamp comprising a body part having a clamping face formed thereon, a sprocket wheel rotatably mounted on said body part, guideways in said body part arranged to extend tangentially on either side of said sprocket wheel, a chain arranged in one of said guideways in engagement with said sprocket wheel, an abutment mounted in the other guideway having pins spaced apart thereon and extending parallel to the axis of rotation of the sprocket wheel, means adapted to impart movement to the abutment so as to bring said pins into engagement with the teeth of the sprocket wheel, and a clamping member secured to an end of the chain which projects from said guideway so that the clamping member is disposed opposite said clamping face.

4. A clamp comprising a body part having a clamping face formed thereon, a sprocket wheel rotatably mounted on said body part, guideways in said body part arranged to extend tangentially on either side of said sprocket wheel, a chain arranged in one of said guideways in engagement with said sprocket wheel, an abutment mounted in the other guideway, means adapted to impart movement to the abutment along said guideway so as to engage the teeth of the sprocket wheel, a resilient member disposed between said latter means and the abutment, and a clamping member secured to an end of the chain which projects from said guideway so that the clamping member is disposed opposite said clamping face.

5. A clamp for securing a cylinder block to a grinding machine comprising a body part having a flat face adapted to extend across the bore of one cylinder, a sprocket wheel rotatably mounted on said body part, guideways in said body part arranged to extend tangentially on either side of said sprocket wheel, a chain arranged in one of said guideways in engagement with said sprocket wheel, an abutment mounted in the other guideway, means adapted to impart movement to the abutment along said guideway so as to engage the teeth of the sprocket wheel, a clamping member pivotally secured to the ends of the chain which projects from said guideway, which clamping member is of sufficient length to extend on either side of a cylinder bore and is stepped so as to locate it laterally in said bore.

WILLIAM GEDEN JOHNSON.
HERBERT FORWARD.

REFERENCES CITED

The following references are of record in the file of this patent:

UNITED STATES PATENTS

| Number | Name | Date |
|---|---|---|
| 1,565,980 | Hughson et al. | Dec. 15, 1925 |
| 2,062,494 | Blazek et al. | Dec. 1, 1936 |

FOREIGN PATENTS

| Number | Country | Date |
|---|---|---|
| 1,352 | Great Britain | Mar. 26, 1881 |
| 2,828 | Great Britain | Feb. 21, 1890 |
| 313,018 | Germany | June 24, 1919 |
| 470,572 | Germany | Jan. 21, 1929 |